United States Patent [19]

Livingston

[11] 4,370,061

[45] Jan. 25, 1983

[54] APPARATUS FOR FINISHING SYNTHETIC POLYMERS

[75] Inventor: Richard D. Livingston, Seaford, Del.

[73] Assignee: E. I. Du Pont de Nemours and Company, Wilmington, Del.

[21] Appl. No.: 283,112

[22] Filed: Jul. 13, 1981

[51] Int. Cl.[3] .................................... B29B 1/10

[52] U.S. Cl. .................................... 366/85; 366/301; 425/225

[58] Field of Search .................... 366/85, 96, 97, 83, 366/84, 301, 300, 297, 298; 425/225, 229, 230

[56] References Cited

U.S. PATENT DOCUMENTS

| | | | |
|---|---|---|---|
| 3,547,261 | 12/1970 | Koch | 366/65 |
| 3,717,330 | 2/1973 | Pinney | 366/301 |
| 4,047,705 | 9/1977 | Hanslik | 366/85 |
| 4,090,261 | 5/1978 | Iwasyk | 366/83 |

*Primary Examiner*—Robert W. Jenkins

[57] ABSTRACT

In a polymer finishing vessel of the type described by Pinney in U.S. Pat. No. 3,717,330 the vent opening is shaped so that its lower edge in the lid of vessel is continuously overlapped by the upper surfaces of the corotating screw elements within the vessel in each of their revolutions while leaving no part of the agitator tips continuously exposed to the open vent area.

3 Claims, 6 Drawing Figures

APPARATUS FOR FINISHING SYNTHETIC POLYMERS

BACKGROUND OF THE INVENTION

This invention relates to an apparatus for finishing synthetic polymers, and more particularly, it relates to an apparatus having vertical screw elements which fully wipe the interior surfaces of the finisher apparatus.

U.S. Pat. No. 3,717,330 issued to Pinney discloses a separator-finisher apparatus suitable for use in the production of synthetic condensation polymers such as polyamides and polyesters. The apparatus disclosed in the patent includes a vessel having an interior surface throughout its vertical length in the shape of two intersecting conical frustums with parallel and substantially vertical axes, the bases of the frustums being displaced upwards with respect to the apexes, two interengaging helical screw elements rotatably mounted within the vessel which upon co-rotation conform to the interior surface of the vessel such that the screw elements effect a complete wiping of the interior surface of the vessel, and the screw elements interengage each other uninterruptedly along their lengths such that each element effects a complete wiping of an adjacent element. The term "wiping" as used herein means relative motion between two elements in close and uniform proximity such that a liquid in the clearance between the elements is subject to high shear. The entire disclosure of the Pinney patent is incorporated herein by way of reference.

When such an apparatus is used for the preparation of polymers, such as poly(hexamethylene adipamide), thermal degradation and gelation tends to occur in stagnant regions of the processing vessel, such as when generated suspended molten polymer particles (aerosols) deposit on conduit surfaces above the vent opening and drain by gravity to the vent edge where stalactites form and dangle into the process stage. These stalactites, which are degraded overage material, periodically break off into the melt pool below and contaminate the process.

SUMMARY OF THE INVENTION

The present invention provides an improvement in the Pinney patent. More particularly, it provides a vent opening of greater radial extent than the path swept by the upper faces of the co-rotating screw elements to permit continuous overlap of the edge of the opening by the upper surface of the co-rotating screw elements to eliminate the stalactites and continuously blend off any material that drains from the conduit above the opening.

FIGS. *2a*, *2b*, and *2c* are cross-sectional views of a prior art apparatus showing the shape of the vent opening in the top plate and its relationship to the wiping action of the top surface of each helical screw element.

Figure 1:
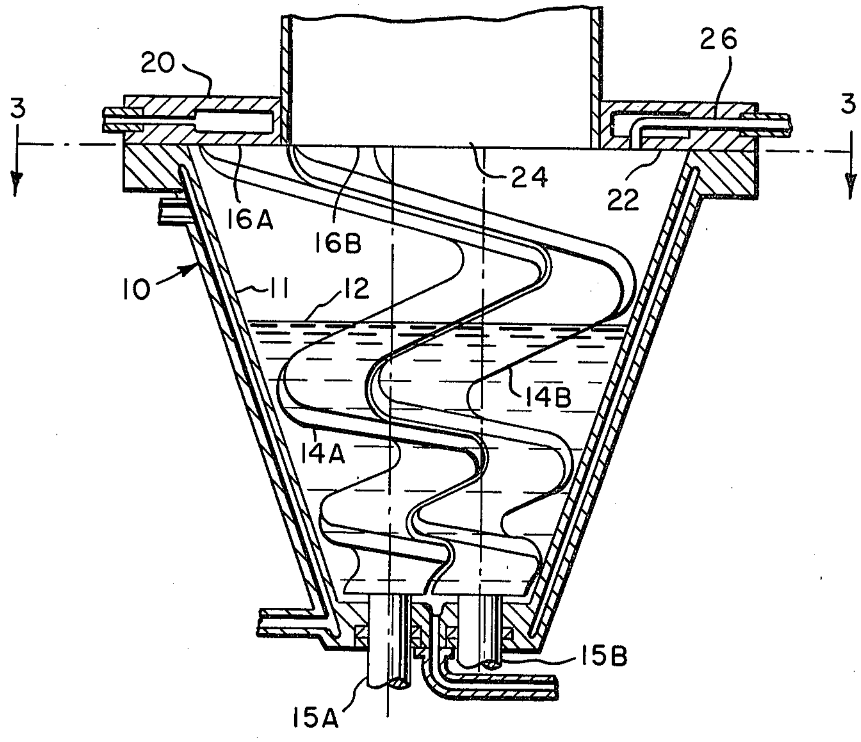
FIG. 1 is a vertical sectional view of one embodiment of the apparatus of this invention.
Figure 3:
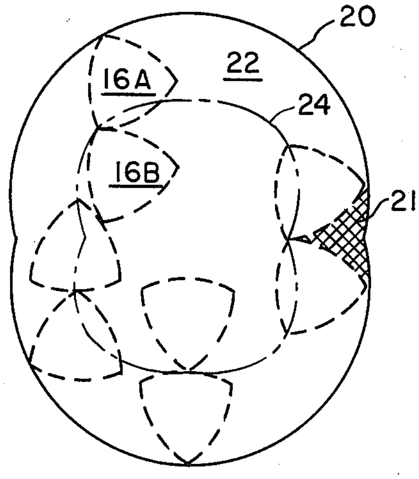

FIG. 3 is a cross-sectional view of FIG. 1 taken along line 3—3 showing an embodiment of the vent opening of this invention.

Figure 4:
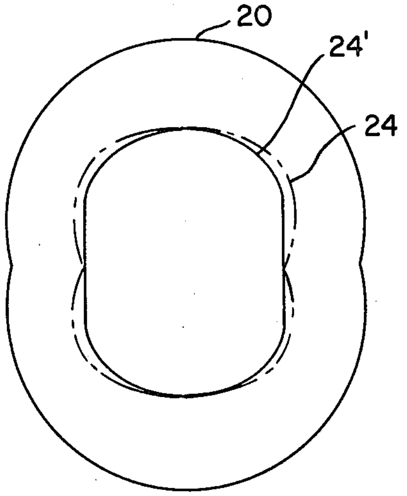

FIG. 4 shows another embodiment of a vent opening of this invention.

DETAILED DESCRIPTION OF THE ILLUSTRATED EMBODIMENTS

Referring to FIG. 1, vessel 10 containing a polymer melt 12 is in the shape of two intersecting conical frustums and has an interior wall surface 11. Two co-rotating interengaging helical screw elements **14*a* and 14*b* are supported on shafts 15*a* and 15*b* respectively. Top plate 20 has an inner surface 22 and contains a vent opening 24 and a polymer inlet 26. The vent opening 24** is connected to an appropriate condenser system (not shown).

Each screw element 14A, 14B has a constant radial cross-section dimension in the plane of rotation; the dimension is approximately equal to the center to center distance of the axes of rotation of each screw element. Each screw element increases in bottom-to-top diameter of the developed cone of rotation at the same rate as the enclosing cone so that its motion wipes the interior wall surface 11 of the vessel. The top surface 16A, 16B of respective screw elements 14A, 14B is flat in the plane of rotation so the screw elements will wipe any portion of the inner surface 22 of top plate 20 that is in its path of rotation. The cross-sectional shape of each screw element is in the form of a trilobe and the two elements 14A, 14B wipe each other.

Figure 2A:
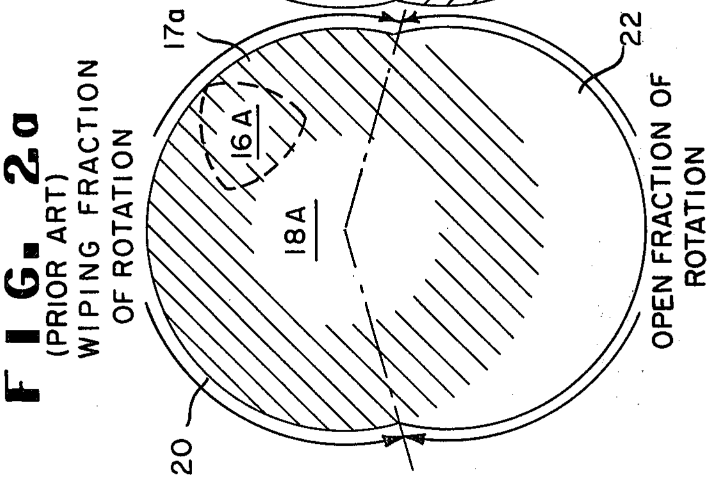
FIG. 2a (PRIOR ART)
Figure 2B:
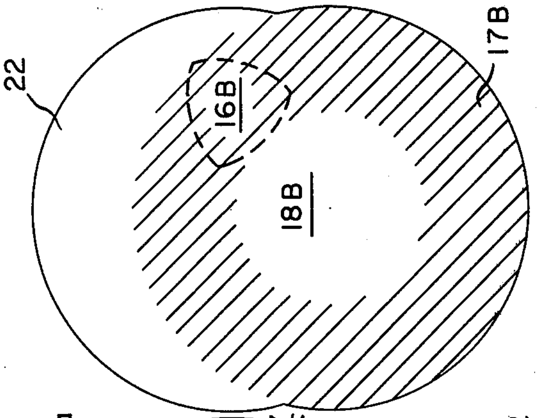
FIG. 2b (PRIOR ART)
Figure 2C:
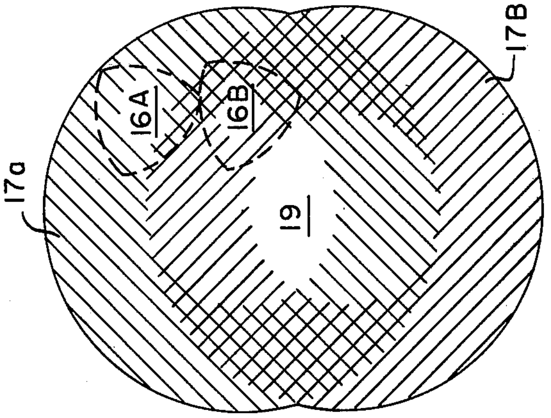
FIG. 2c (PRIOR ART)

Referring now to Prior Art FIGS. 2A, 2B and 2C, and considering only the top surface of each blade rotating in close proximity to the inner surface 22 of top plate 20, it can be seen that each top surface 16A, 16B of elements 14A, 14B wipes an annulus 17A, 17B respectively of surface 22 leaving an unwiped center portion 18A, 18B (FIGS. 2A, 2B). Considering the wiping action in normal combination of the top surfaces 16A, 16B of both elements 14A, 14B in FIG. 2C, some of the area of surface 22 is wiped only by one of the two elements, some of the area is doubly wiped by the overlapping action of the top surfaces 16A, 16B and some of the area in the center (designated 19 in FIG. 2C) remains unwiped by either surface. Geometrically the unwiped center area 19 is in the shape of a football as made up of two, less than semicircular, arcs. Each arc is generated by the innermost point of the top surface (16A, 16B) during most of the open fraction of its rotation, the open fraction being where the element is no longer wiping surface 11 of the vessel and the remainder being the wiping fraction. The unwiped football area 19 was cut out and became the vent opening in the prior art apparatus and, as shown, the screw elements do not shear or overlap the edge of the vent opening anywhere. As a consequence, stalactites form at the edge, periodically break off into the melt pool below and contaminate the process.

Referring now to FIG. 3 which shows an embodiment of the vent opening 24 of this invention, it is required that the top surface 16A, 16B of each element be completely under surface 22 of lid 20 at some point in its rotation. Also it is required that vent opening 24 not extend outward so that the outboard space 21 between the elements becomes exposed. The maximum tolerable open area for vent opening 24 is defined as the locus of points of nearest approach of the edges of the top surfaces 16A, 16B of each element, 14A, 14B, to each other. This locus is opening 24. As seen in FIG. 3, the top surfaces of the elements overlap and shear the edge of opening 24 all over. Such action eliminates the formation of stalactites and continuously blends off any material that drains from the vent above the opening 24.

A more readily machined version of opening is shown as opening 24' in FIG. 4. This is called the single overlap racetrack and is readily formed by two semicircles separated by tangents to the semicircles.

What is claimed is:

1. In an apparatus for finishing synthetic polymers including an enclosed vessel having an interior surface throughout its length in the shape of two intersecting conical frustums with axes parallel and substantially vertical, the base of the frustums being displaced upward with respect to the apexes, two driven interengaging helical screw elements rotatably supported on shafts passing through seals in the base of the vessel, the screw elements when co-rotated conforming to the interior surface of the vessel such that the screw elements effect a complete wiping of the interior surface, and wherein the screw elements interengage uninterruptedly along their lengths such that each element effects a complete wiping of the adjacent element and wherein the vessel has a top plate with a vent opening therethrough, said top plate having a flat inner surface and the screw elements having substantially flat upper surfaces which when co-rotated conform to said top inner surface such that the upper surface of the screw elements effect a complete cleaning of said top inner surface, the improvement comprising: said vent opening being of greater radial extent than the paths swept by the upper surfaces of the co-rotating screw elements to permit continuous overlap of the edge of the opening by the upper surface of the co-rotating screw elements.

2. The apparatus as defined in claim 1, said vent opening being defined as the locus of all points of nearest approach of the edges of the upper surface of the screw elements to each other.

3. The apparatus as defined in claim 1, said vent opening being in the shape of two semicircles separated by tangents.

* * * * *